United States Patent
Yamamoto

(10) Patent No.: US 7,943,540 B2
(45) Date of Patent: May 17, 2011

(54) OPTICAL GLASS FOR PRECISION MOLDING HAVING HIGH REFRACTIVE INDEX

(75) Inventor: Yoshinori Yamamoto, Saitama (JP)

(73) Assignee: Sumita Optical Glass, Inc., Saitama (JP)

( * ) Notice: Subject to any disclaimer, the term of this patent is extended or adjusted under 35 U.S.C. 154(b) by 817 days.

(21) Appl. No.: 11/905,925

(22) Filed: Oct. 5, 2007

(65) Prior Publication Data
US 2008/0096753 A1    Apr. 24, 2008

(30) Foreign Application Priority Data
Oct. 23, 2006 (JP) ................. 2006-287874

(51) Int. Cl.
- C03C 3/253 (2006.01)
- C03C 3/14 (2006.01)
- C03C 3/15 (2006.01)
- C03C 3/155 (2006.01)
- C03C 3/068 (2006.01)

(52) U.S. Cl. ............ 501/50; 501/42; 501/49; 501/51; 501/78

(58) Field of Classification Search ............ 501/49–51, 501/78, 42
See application file for complete search history.

(56) References Cited

U.S. PATENT DOCUMENTS

| | | | |
|---|---|---|---|
| 2003/0191006 A1 | 10/2003 | Natsugari et al. | |
| 2004/0252961 A1 | 12/2004 | Peuchert et al. | |
| 2005/0181927 A1* | 8/2005 | Hasegawa et al. | 501/79 |
| 2007/0054794 A1* | 3/2007 | Nagaoka et al. | 501/65 |

FOREIGN PATENT DOCUMENTS

| | | |
|---|---|---|
| EP | 1 760 048 A1 | 3/2007 |
| JP | 2002-201039 | 7/2002 |
| JP | 2005-179142 | 7/2005 |
| JP | 2006327925 A | 12/2006 |
| JP | 2006327926 A | 12/2006 |
| WO | WO 03/022766 A1 | 3/2003 |
| WO | WO 2004/074197 A1 | 9/2004 |

OTHER PUBLICATIONS

European Search Report dated Jan. 29, 2008.

* cited by examiner

*Primary Examiner* — David M. Brunsman
*Assistant Examiner* — Kevin M Johnson
(74) *Attorney, Agent, or Firm* — Dickstein Shapiro LLP

(57) ABSTRACT

An optical glass for precision molding having a high refractive index (nd) and a low yield temperature (At). The optical glass comprises, as glass components in wt %, 64 to 83% of $Bi_2O_3$; 4 to 17% of $B_2O_3$; 0 to 12% of $GeO_2$ (wherein the total of $B_2O_3$ and $GeO_2$ is 10 to 20%); 0 to 7% of $La_2O_3$; 0 to 7% of $Gd_2O_3$ (wherein the total of $La_2O_3$ and $Gd_2O_3$ is 1 to 13%); 0 to 4% of $ZrO_2$; 0 to 5% of $Ta_2O_5$; 0 to 15% of ZnO; 0 to 2% of $Sb_2O_3$; and 0 to 1% of $In_2O_3$. The optical glass has optical constants, that is, a refractive index (nd) of 2.05 to 2.25 and an Abbe number (vd) of 15 to 22, and a yield temperature (At) of 510° C. or less.

1 Claim, No Drawings

OPTICAL GLASS FOR PRECISION MOLDING HAVING HIGH REFRACTIVE INDEX

BACKGROUND OF THE INVENTION

1. Field of the Invention

The present invention relates to a $Bi_2O_3$—$B_2O_3$ optical glass for precision molding having a refractive index (nd) of 2.05 or more.

2. Description of the Related Art

With the spread and development of digital optical devices in recent years, there is a demand for higher performance and size-reduction of optical lenses. To meet this demand, it is essential to make optical designs by using aspheric lenses manufactured by a precision molding method. Then, an optical glass used for this aspheric lens is required to have the highest possible refractive index (nd) and the lowest possible yield temperature (At). The yield temperature is defined herein as a temperature at which glass expansion associated with temperature increase stops and contraction starts, which is almost equivalent to a glass molding temperature, However, very few conventional optical glasses have a refractive index (nd) exceeding 2.0.

As glasses having a high refractive index, known are glasses, which are disclosed in, for example, Patent Documents 1 to 5.

Patent Document 1 discloses a $B_2O_3$—$La_2O_3$ optical glass having a refractive index (nd) of 1.8 to 2.1, but does not disclose a specific composition of a glass with a refractive index (nd) higher than 2.00030. Further, the glass disclosed in Patent Document 1 contains much $La_2O_3$ and $TiO_2$, so that the glass has a high yield temperature (At).

Further, Patent Document 2 describes a glass for precision molding containing $Bi_2O_3$ in large quantity. In general, the refractive index of a glass becomes smaller as the wavelength is longer. The glass disclosed in Patent Document 2 has a refractive index of 1.9 or more for light with a wavelength of 0.8 μm, and a low yield temperature (At) of 540° C. However, the glass for press molding disclosed therein is applied to light with long wavelengths of about 0.8 to 1.8 μm, and not developed on the premise of the use in the visible light region. In other words, since the glass is thickly colored, the glass disadvantageously has a remarkably low light transmission performance in the visible light region, particularly in the blue region.

Furthermore, all the glasses disclosed in Patent Documents 3 to 5 relate to glass fibers used for optical communication. They relate to glasses for optical fibers intended for application to the optical communication field on the premise of the use in the infrared light region.

As described above, among optical glasses used for conventional optical lenses, particularly aspheric lenses manufactured by precision molding, there are no highly-refractive optical glasses having a high refractive index (nd) of 2.05 or more. Thus, there has been a demand for developing such highly-refractive optical glasses.

[Patent Document 1] Japanese Patent Laid-Open No. 2005-179142

[Patent Document 2] Japanese Patent Laid-Open No. 2002-201039

[Patent Document 3] National Publication of International Patent Application No. 2005-502576, which corresponds to International Application No. PCT/EP2002/010059; and International Publication No. WO2003/022766

[Patent Document 4] National Publication of International Patent Application No. 2006-518325, which corresponds to International Application No. PCT/EP2004/000530; and International Publication No. WO2004/074197

[Patent Document 5] National Publication of International Patent Application No. 2005-503008, which corresponds to International Application No. PCT/EP2002/010058; and International Publication No. WO2003/022768

An object of the present invention is to provide an optical glass for precision molding having a high refractive index (nd) and a low yield temperature (At) on the premise of its use in the visible light region.

SUMMARY OF THE INVENTION

The present inventors have made intensive research for achieving the above object. As a result, they have found that the above object can be achieved by a $Bi_2O_3$—$B_2O_3$ optical glass.

Namely, an optical glass for molding of the present invention comprises as glass components in wt %, 64 to 83% of $Bi_2O_3$;
4 to 17% of $B_2O_3$;
0 to 12% of $GeO_2$ (wherein the total of $B_2O_3$ and $GeO_2$ is 10 to 20%);

to 82.0 wt %.

$B_2O_3$ is also an essential component of the present invention for forming a glass network structure. $B_2O_3$ has effects of enhancing melting properties of glass and easily vitrifying other raw material components. However, less than 4 wt % of $B_2O_3$ deteriorates devitrification resistance and more than 17 wt % thereof cannot offer a desired refractive index. The content thereof is preferably 5.0 to 16.0 wt %.

$GeO_2$ is an optional component of the present invention and a very effective component for raising a refractive index of glass. $GeO_2$ is a component for forming a glass network structure, like $B_2O_3$, but has a poor ability to enhance devitrification resistance. Thus, more than 12 wt % of $GeO_2$ increases devitrification tendency, resulting in an unstable glass. Preferably, the content thereof is 0 to 11.0 wt %.

Then, if the total content of $B_2O_3$ and $GeO_2$ is out of the range from 10 to 20 wt %, a glass cannot be obtained. The range is preferably from 12.0 to 18.0 wt %.

$La_2O_3$ is an optional component of the present invention, but a component for enhancing a refractive index without coloring a glass. Further, mixing of $La_2O_3$ with $B_2O_3$ in this composition is effective to devitrification resistance, but more than 7 wt % of $La_2O_3$ deteriorates devitrification resistance. The content thereof is preferably 0 to 6.0 wt %.

$Gd_2O_3$ is an optional component of the present invention. Combined use thereof with $La_2O_3$ enhances devitrification resistance, but more than 7 wt % thereof deteriorates devitrification resistance. The content thereof is preferably 0 to 6.0 wt %.

Then, if the total content of $La_2O_3$ and $Gd_2O_3$ is out of the range from 1 to 13 wt %, a glass cannot be obtained. The range is preferably from 1.5 to 12.0 wt %.

$ZrO_2$ is an optional component of the present invention. A small amount of addition thereof enhances devitrification resistance and chemical durability, but more than 4 wt % thereof deteriorates devitrification resistance. The content thereof is preferably 0 to 3.0 wt %.

$Ta_2O_5$ is an optional component of the present invention. $Ta_2O_5$ can stabilize a glass, but more than 5 wt % thereof destabilize a glass. The content thereof is preferably 0 to 4.0 wt %.

ZnO is an optional component of the present invention, which has an effect of keeping a yield temperature (At) low and can enhance solubility, devitrification resistance, and chemical durability. However, more than 15 wt % thereof makes it difficult to provide a desired refractive index. The content thereof is preferably 0 to 14 wt %.

In addition to the above components, the addition of $Sb_2O_3$ and $In_2O_3$ can lighten the color of glass. The addition amounts of $Sb_2O_3$ and $In_2O_3$ are 0 to 2.0 wt % and 0 to 1.0 wt %, respectively. Further additionally, $SiO_2$, $TiO_2$, $Li_2O$, $Na_2O$, $K_2O$, MgO, CaO, SrO, BaO, $Al_2O_3$, $Ga_2O_3$, $Y_2O_3$, $Yb_2O_3$ or the like may be incorporated for controlling the optical constants, improving the melting property, and increasing glass stability as long as the object of the present invention is satisfied. However, no addition of these components is preferable in order to obtain a good quality glass conforming more to the above object.

EXAMPLE

Hereafter, an optical glass of the present invention is described in detail by referring to Examples, but the present invention is not limited to these Examples.

Optical glasses of Examples 1 to 10 were produced by: weighing each raw material compound so that each Example had a proportion of component composition as shown in the column of composition in the following Table 1; sufficiently mixing the raw material compounds; inputting them in a platinum crucible to melt at 900 to 1150° C. by an electric furnace; stirring the mixture for homogenization at appropriate timings; clarifying and then casting the mixture in a metallic mold preheated at a suitable temperature; and gradually cooling. In the tables, each component for composition is expressed in wt % and mol %.

The obtained optical glasses of Examples 1 to 10 were measured by known methods in terms of optical constants (refractive index (nd) and Abbe number (vd)) and the yield temperature (At/° C.). Results are shown in Table 1 together with the composition of each optical glass.

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Composition | $GeO_2$ | 5.61 | 4.84 | 10.15 | 8.60 | — | 1.13 | 4.50 | 2.16 | 4.00 | 8.64 |
| | | (12.66) | (9.09) | (24.58) | (23.29) | | (2.68) | (10.54) | (5.36) | (9.34) | (21.16) |
| | $B_2O_3$ | 11.09 | 9.62 | 7.84 | 5.34 | 15.11 | 13.88 | 13.0 | 12.28 | 13.00 | 7.90 |
| | | (37.58) | (27.11) | (28.54) | (21.74) | (53.12) | (49.51) | (45.74) | (45.71) | (45.64) | (29.08) |
| | $La_2O_3$ | 5.65 | 2.75 | 2.64 | 2.77 | 2.73 | 5.50 | — | 1.42 | 2.00 | 5.20 |
| | | (4.09) | (1.66) | (2.05) | (2.40) | (2.05) | (4.19) | | (1.13) | (1.50) | (4.10) |
| | $Gd_2O_3$ | 5.79 | 2.82 | 2.71 | 2.84 | 2.80 | — | 2.00 | 1.42 | 2.00 | 5.33 |
| | | (3.77) | (1.53) | (1.89) | (2.22) | (1.89) | | (1.35) | (1.01) | (1.35) | (3.77) |
| | $ZrO_2$ | 2.76 | 0.83 | 0.80 | 0.84 | 0.83 | 0.83 | — | 0.47 | 0.50 | 1.10 |
| | | (5.28) | (1.33) | (1.64) | (1.92) | (1.64) | (1.67) | | (0.99) | (0.99) | (2.28) |
| | $Bi_2O_3$ | 64.73 | 64.31 | 74.12 | 77.78 | 76.73 | 77.15 | 78.50 | 81.31 | 78.50 | 68.38 |
| | | (32.79) | (27.11) | (40.30) | (47.26) | (40.30) | (41.10) | (41.26) | (45.24) | (41.18) | (37.61) |
| | $Ta_2O_5$ | 3.74 | 1.82 | 1.74 | 1.83 | 1.80 | 1.51 | 2.00 | 0.94 | — | 3.45 |
| | | (2.00) | (0.81) | (1.00) | (1.17) | (1.00) | (0.85) | (1.11) | (0.56) | | (2.00) |
| | ZnO | 0.63 | 13.0 | — | — | — | — | — | — | — | — |
| | | (1.83) | (31.36) | | | | | | | | |
| Characteristic value | nd | 2.07313 | 2.06095 | 2.12609 | 2.19767 | 2.07384 | 2.09480 | 2.09324 | 2.12005 | 2.09293 | 2.11951 |
| | vd | 20.34 | 19.29 | 18.07 | 16.28 | 19.54 | 18.87 | 18.73 | 17.96 | 18.74 | 20.98 |
| | At/° C. | 509 | 463 | 461 | 440 | 467 | 454 | 454 | 438 | 451 | 489 |

*Unit of Composition is wt % in this Table (mol % notation in brackets).

Table 1 shows that each optical glass of the present invention shown in Examples has a refractive index (nd) of 2.05 to 2.25 and an Abbe number (vd) of 15 to 22, and a yield temperature (At) of 510° C. or less.

What is claimed is:

1. An optical glass for precision molding comprising, as glass components in wt %,
   64 to 83% of $Bi_2O_3$;
   4 to 17% of $B_2O_3$;
   0 to 12% of $GeO_2$;
   0 to 7% of $La_2O_3$;
   0 to 7% of $Gd_2O_3$;
   0 to 4% of $ZrO_2$;
   0 to 5% of $Ta_2O_5$;
   0 to 15% of ZnO;
   0 to 2% of $Sb_2O_3$; and
   0 to 1% of $In_2O_3$,
   wherein the total of $B_2O_3$ and $GeO_2$ is 10 to 20%,
   wherein the total of $La_2O_3$ and $Gd_2O_3$ is 1 to 13%,
   the optical glass having optical constants, that is, a refractive index nd of 2.05 to 2.25 and an Abbe number vd of 15 to 22, and a yield temperature At of 510° C. or less.

* * * * *